UNITED STATES PATENT OFFICE.

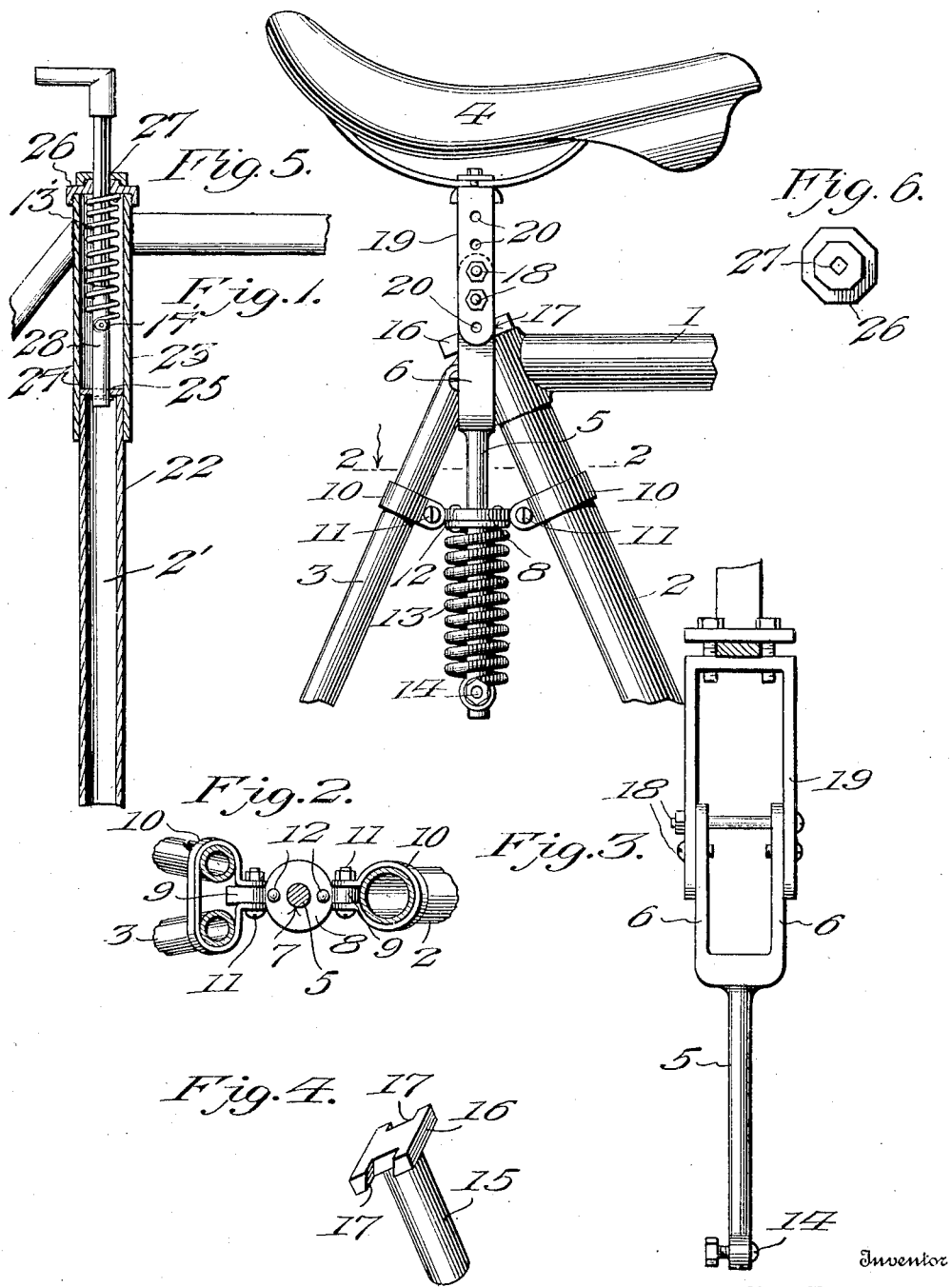

CARL OLSON, OF WASHINGTON, DISTRICT OF COLUMBIA.

SADDLE-POST.

No. 878,419.      Specification of Letters Patent.      Patented Feb. 4, 1908.

Application filed January 18, 1906. Serial No. 296,587. Renewed July 13, 1907. Serial No. 383,623.

*To all whom it may concern:*

Be it known that CARL OLSON, a citizen of the United States, residing at Washington, in the District of Columbia, have invented new and useful Improvements in Saddle-Posts, of which the following is a specification.

This invention relates to saddle posts designed for use upon bicycles or other velocipedes, and has for its objects to produce a comparatively simple, inexpensive device of this character which may be readily installed for use, one whereby the saddle will be yieldably sustained for vertical movement, and one wherein the saddle post will be effectually guided in its movements.

With these and other objects in view, the invention comprises the novel features of construction and combination of parts more fully hereinafter described.

In the accompanying drawings: Figure 1 is a side elevation of a portion of a bicycle equipped with a saddle post embodying the invention. Fig. 2 is a detail section taken on the line 2—2 of Fig. 1. Fig. 3 is a detail elevation of the saddle post. Fig. 4 is a perspective view of the guide member. Fig. 5 is a view partly in section, illustrating a slightly modified embodiment of the invention. Fig. 6 is a top plan view of the principal bearing member employed in the modified form of the device.

Referring to the drawings, 1 designates a bicycle frame including the usual tubular center brace or frame member 2 and a rear frame member or brace 3, and equipped with a saddle 4 sustained by a post or standard 5, these parts, except as hereinafter explained, being of the usual construction and material and adapted to perform their ordinary functions. The post 5, which is provided at its normally upper end with a bifurcated portion or fork presenting spaced side portions or arms 6, is arranged for vertical sliding movement through a central bearing opening 7 formed in a bearing member or head 8 having radially projecting ears 9 and positioned between the frame members 2 and 3 to which it is detachably secured by means of clips 10 in turn attached to the ears 9 by bolts or other fastening members 11, there being riveted as at 12 to the bearing member 8 the upper end of a normally contracted spring 13 coiled upon the lower portion of the seat post and having its other end se-
cured to the lower end of the latter by means of a fastening member or bolt 14.

Fitted in the upper end of the frame member 2 is a guide member or plug 15 having a head 16 provided with guide openings or ways 17 designed to receive respectively the side portions 6 of the fork which straddles the adjacent portion of the bicycle frame while attached to the upper forked portion of the post by means of horizontal bolts 18 is a U-shaped member or section 19 having its side portions which seat upon the outer faces of and overlap the side portions 6, provided with a vertically spaced series of openings 20 designed to accommodate the bolts 18, thus to permit relative adjustment of the post and section, to which latter the saddle is attached by means of screws 21.

In practice, the post 1 is yieldably sustained by the spring 13 to permit vertical movement of the saddle 4 during travel of the bicycle over an uneven surface, the post being guided in its movements owing to the engagement of its arms 6 with the guide openings 17 and the slidable disposition of its lower portion in the bearing opening 7. It is to be observed that the device may be readily applied to the various forms of velocipedes now in general use, and furthermore that owing to engagement of the post with the guides 7 and 17 tilting of the post from its initial vertical position is obviated. The ears 9 are provided with suitable slots through which the bolts 11 work, thus permitting a relative adjustment of the clips 10 toward and from each other, whereby they may be moved upward or downward on the frame members 2 and 3, as circumstances require.

In the form of device illustrated in Figs. 5 and 6 the frame member 2' comprises a lower section 22 and an upper section 23, said sections having their meeting ends telescopically engaged, there being seated upon the upper end of section 22 a bearing member 24 having a guide opening 25 and upon the upper end of section 23 a bearing member 26 provided with a bearing opening 27, while disposed for vertical sliding movement in the openings 25, 27, is a seat post 28 having its upper portion squared or of non-circular form and fitted within the opening 27 of similar form for preventing rotation of the post, upon which is coiled a spring 13' having its upper end fixed to the bearing member 26 and its lower end secured to the post 28 by means of a screw 14', as in the form of device disclosed in Fig. 1.

From the foregoing it is apparent that I produce a simple device admirably adapted for the attainment of the ends in view, it being understood that in attaining these ends minor changes in the details herein set forth may be resorted to without departing from the spirit of the invention.

Having thus described my invention, what I claim is:

1. In combination with a velocipede frame including a tubular brace, a member seated in the upper end of said brace and having a head provided with guide openings, a saddle post having its upper end bifurcated to form side portions arranged for movement respectively in said guide openings, clips attached to the frame, a bearing member supported by said clips and having a guide opening to slidably receive the lower portion of the saddle post, a saddle carried by the latter, and an expansible spring arranged upon the lower portion of the post and having its lower end attached to the latter and its upper end attached to the bearing member.

2. In combination with a velocipede frame including a tubular brace member, a bearing plug seated in the upper end of said member and having a head provided with opposed bearing openings, a vertically movable saddle post having a forked portion presenting side bars arranged for movement respectively in said openings, a post section adjustably connected with the side portions of the post, a saddle carried by said section, a bearing member connected in the frame beneath said head and having a guide opening to slidably receive the lower portion of the post, and an expansible spring arranged on the lower portion of the post and attached at its lower end to the latter, the upper end of the spring being attached to the lower bearing member.

In testimony whereof, I affix my signature in presence of two witnesses.

CARL OLSON.

Witnesses:
   JOHN L. FLETCHER,
   K. ALLEN.